US007784069B2

(12) United States Patent
Boss et al.

(10) Patent No.: US 7,784,069 B2
(45) Date of Patent: Aug. 24, 2010

(54) SELECTING DIVERGENT STORYLINES USING BRANCHING TECHNIQUES

(75) Inventors: Gregory J. Boss, Salt Lake City, UT (US); Kevin C. McConnell, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1451 days.

(21) Appl. No.: 10/725,735

(22) Filed: Dec. 1, 2003

(65) Prior Publication Data

US 2005/0120389 A1 Jun. 2, 2005

(51) Int. Cl.
*H04H 60/32* (2008.01)

(52) U.S. Cl. .............................. 725/16; 725/24; 705/12

(58) Field of Classification Search .................. 705/12; 725/16, 24

See application file for complete search history.

(56) References Cited

U.S. PATENT DOCUMENTS

| | | | | |
|---|---|---|---|---|
| 5,400,248 A * | 3/1995 | Chisholm | ...................... | 705/12 |
| 5,465,384 A * | 11/1995 | Bejan et al. | ................. | 455/2.01 |
| 5,676,551 A | 10/1997 | Knight et al. | ................ | 434/236 |
| 5,737,527 A * | 4/1998 | Shiels et al. | ................. | 725/114 |
| 5,841,741 A | 11/1998 | Freeman | ....................... | 369/33 |
| 6,166,735 A | 12/2000 | Dom et al. | .................. | 345/339 |
| 6,243,740 B1 * | 6/2001 | Minneman et al. | ........... | 709/206 |
| 6,246,402 B1 | 6/2001 | Setogawa et al. | ............ | 345/328 |
| 6,360,055 B1 | 3/2002 | Kaneshige et al. | ............. | 386/70 |
| 6,947,966 B1 * | 9/2005 | Oko et al. | .................... | 709/203 |
| 2001/0014209 A1 | 8/2001 | Moriyama et al. | ............. | 386/95 |
| 2002/0053089 A1 | 5/2002 | Massey | ....................... | 725/135 |
| 2002/0178442 A1 * | 11/2002 | Williams | ....................... | 725/13 |
| 2003/0068161 A1 | 4/2003 | Lasorsa et al. | ............... | 386/111 |
| 2003/0093790 A1 * | 5/2003 | Logan et al. | ................... | 725/38 |
| 2004/0009813 A1 * | 1/2004 | Wind | ........................... | 463/30 |

OTHER PUBLICATIONS

Osborn, Brian: "An Agent-Based Architecture for Generating Interactive Stories", dissertation from the Naval Postgraduate School, Sep. 2002.*

* cited by examiner

*Primary Examiner*—Scott L Jarrett
*Assistant Examiner*—Mark A Fleischer
(74) *Attorney, Agent, or Firm*—Cahn & Samuels LLP

(57) ABSTRACT

Divergent storylines for media such as movies are selected using branching techniques. Enhancing the "replay value" of a movie may be accomplished by introducing many logical branches in the action and plot during the movie. Consequently, repeat viewing is encouraged by creating a dynamic viewing environment based on the preferences of the current audience. The audience may be polled prior to each logical branch. Votes are then tallied and the logical branch is selected. Viewers may also indicate preferences regarding the movie rating. Consequently, a movie may be rated for children at one viewing and adults at another. Votes or other viewer feedback may be collected by a variety of methods. The privilege of voting for particular storyline branches or other content choices may be provided for free or purchase. Each time a branch in the storyline appears the viewer may then vote to influence the direction taken by the storyline. Multiple opportunities for voting may appear during the movie. Votes may be weighted and purchased based on a variable or flexible cost structure. Purchase of a movie ticket may convey to the viewer the ability to not only view the movie but also influence the outcome of the movie. The ability to influence the outcome of the movie may be closely related to the price of the ticket.

27 Claims, 3 Drawing Sheets

SELECTING DIVERGENT STORYLINES USING BRANCHING TECHNIQUES

FIELD OF THE INVENTION

The present invention generally relates to presentation of media using logical branching in storylines or plots. More specifically, the present invention relates to a method for selecting logical branches in storylines on votes or selections by members of the audience, in which some votes may be weighted more than others.

BACKGROUND OF THE INVENTION

Entertainment events such as motion pictures are mostly presented in a static form. Once a motion picture is released, one version of that motion picture is presented in theaters across the nation and world. Occasionally, motion pictures generate a following among viewers that generates repeat viewings of the motion picture because of the popularity of the movie, the subject, the special effects, or other intangible aspects of the movie. Motion picture producers have no readily available means for generating repeat revenues on a released movie.

Movie producers may wish to have available, some means of encouraging repeat viewing of the movie. One method for encouraging repeat viewing is to produce a movie that is different each time it is viewed in the theater.

Currently, variations in a movie are introduced when the movie is released in DVD format for home viewing. These DVDs may have alternate endings, director's cuts, or some verbal documentary that plays along with the movie. However, these variations in the movie are still static and the movie on DVD is much the same as presented in the theater.

Systems for providing dynamic movies have been proposed using logical branching in the movie storyline. These systems describe the technical aspects of creating a movie using branching techniques and audience interaction through noise and other means. However, no method is introduced by which repeat viewing of a movie is encouraged and voting on particular branches in the movie storyline is used as part of the revenue for the movie.

What is therefore needed is a system, a service, a computer program product, and an associated method for encouraging repeat patronage, to increase the revenues of a movie or other media, by providing a method by which the viewer may influence the action and plot of the movie. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for showing and selecting divergent storylines using branching techniques in movies. Enhancing the "replay value" of a movie may be accomplished by introducing numerous logical branches in the action and plot, while the movie is being played (that is on a "real-time" basis). Such dynamic movies may be produced and presented using known or available digital technologies.

The present system provides a method for encouraging repeat viewing of a movie, creating a viewing environment that is dynamic and based on the preferences of the current audience. Viewers receive high value for the price of the movie ticket because they are seeing a different version each time they view the movie. Movie producers are able to increase the revenue for the movie because more patrons may return to view it in the theaters.

A storyline branching technique allows a movie to take multiple different paths through the plot. Storyline branching occurs when the movie is projected on the screen. If in DVD form, storyline branching occurs when the movie is displayed on the screen or the display device, such as computer LCD display, TV display, front projection, or rear projection.

For the example of the movie with storyline branching, equipment in the projection booth selects and changes scenes in real time. At certain places in the movie, a choice or logical branch occurs. The movie projector may display, for example, either scene A or scene B, based on certain criteria. At any logical branch, multiple options may be presented. These logical branches may occur at many places in the movie, such that the odds of seeing the same version of the movie twice are remote. It should be understood that a branch could have more than 2 choices, such as scenes A, B, C, or D.

The present system provides the criteria for logical branching in the form of feedback or votes from the viewers or voters. The audience may be polled prior to each logical branch regarding the preferred path for the storyline based on the portion of the movie previously seen.

For example, a car traveling down a road may reach a fork in the road. The present system presents a choice to the audience, the left fork or right fork in the road. The present system then tallies the votes and instructs the movie projector which logical branch to select according to the feedback from the audience.

The feedback from the audience may be in the form of specific actions taken in the storyline or general plot of the movie. For example, prior to the movie the present system may provide a method by which the viewer may select general plot preferences such as tragedy, comedy, drama, action, etc. In addition, viewers may select nuances within those genres such as indicating a preference whether the main character does or does not die.

Viewers may also indicate preferences regarding the level of violence, bloodshed, language, or sexual content presented in the movie. Consequently, a movie may be rated for children at one viewing and adults at another. The theater owner may also select these preferences such that, for example, matinee movies are appropriate for younger audiences while late night showings are appropriate for adults. The present system also allows storyline variations within the context of different ratings.

Feedback utilized by the present system in selecting storylines or other content of the visual entertainment media may be collected by a variety of methods. For example, a viewer may vote on-line for general or specific variations in the storyline when a movie ticket is purchased over the Internet. The viewer may also vote when buying a ticket at the theater ticket window. A voting kiosk may be available in the theater lobby for voting by viewers. Viewers may vote in the theater as the movie plays by using keypads, touch screens, or other interactive devices. Viewers may also call in a vote using their wireless device such as a cell phone or a PDA.

The privilege of voting for particular storyline branches or other content choices may be provided by the theater for free or may be provided as an upgrade to a basic ticket. For example, the viewer may receive two votes with the movie ticket price; for an addition dollar, the viewer receives an additional ten votes. Each time a branch in the storyline appears the viewer may then use a vote to influence the direction taken by the storyline. Multiple opportunities for voting may appear during the movie. Votes may be weighted and purchased based on a variable or flexible cost structure.

Purchase of a movie ticket may convey to the viewer the ability to not only view the movie but also influence the outcome of the movie. The ability to influence the outcome of the movie may be closely related to the price of the ticket.

The logical branches selected in a movie screening may be represented as a series of numbers, or a movie matrix. This movie matrix represents the version of the movie as viewed. Using the movie matrix, the present system can exactly replicate the movie. The movie matrix may be used to specify a movie that a viewer wishes to see in the theater, on DVD, on television, etc. When referencing a specific screening of a movie, movie critics, viewers, and others may reference the movie matrix.

While discussed in terms of motion pictures, the present system may also be applied to any visual media such as DVDs, media such as broadcast television, cable, etc. Viewers may select various plot branches for movies on DVD. Television dramas, news, etc. may be tailored to a viewer's preferences through the present system. For example, parents may specify allowable content ratings for television programs viewed by their children at one television set in the home. The television set in the parent's bedroom may have a specified content rating suitable for adults. The children viewing in the den and the parents viewing in the bedroom may then select variations in the storyline presented in the drama within the specified content rating.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Gateway: A device that connects two computer networks that use different protocols. It translates between protocols so that computers on the connected networks can exchange data. For example, commercial online services often have gateways for sending e-mail to Internet addresses.

Internet: A collection of interconnected public and private computer networks that are linked together with routers by a set of standard protocols to form a global, distributed network.

PBX (Private Branch Exchange): A telephone exchange used within an organization and located on the premises; an example would be the main switchboard in a hospital.

PDA (Personal Digital Assistant): A handheld computer that serves as an organizer for personal information. PDAs are pen based and use a stylus to tap selections on menus and to enter printed characters. The unit may also comprise a small on-screen keyboard that is tapped with the pen. Data are synchronized between the PDA and desktop computer via cable or wireless transmission.

Votes: Comprise votes, feedback, or the indicated preference of a voter for a desired action to take place.

Voters: Comprise voters, audience, the individuals watching or participating in the direction or path the movie takes.

Figure 1:
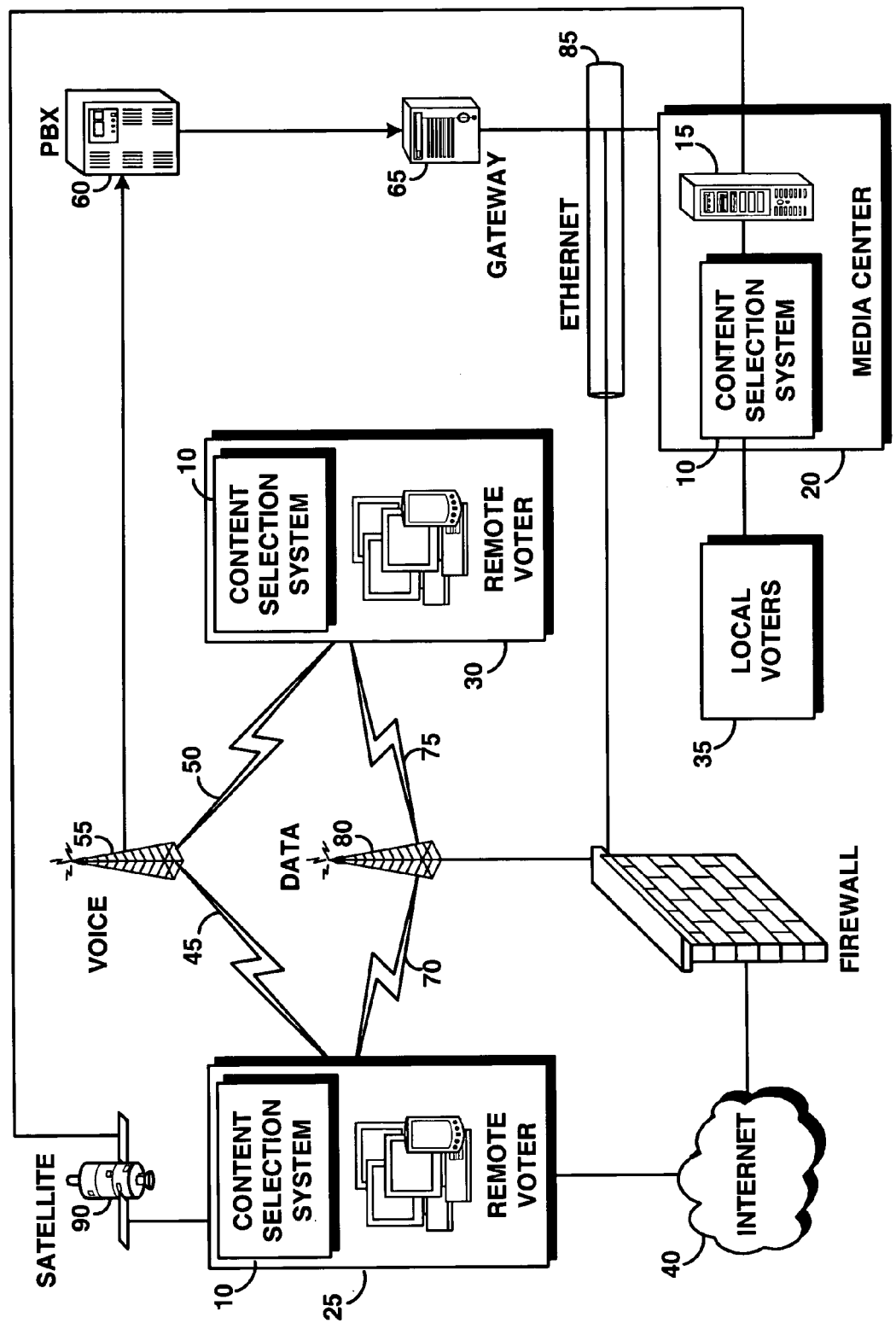
FIG. 1 is a schematic illustration of an exemplary operating environment in which a content selection system of the present invention can be used.

FIG. 1 portrays an exemplary overall environment in which a system, method, and service for showing and selecting diverging storylines using branching techniques according to the present invention may be used. System 10 includes a software programming code or computer program product that is typically embedded within, or installed on a server 15 at a media center 20.

Media center 20 may be any entity that presents recorded media such as a movie theater, a radio station, a broadcast, a satellite, or a cable television station, etc. The function performed by system 10 can also be implemented in a computer, PDA, or other wireless handheld device, cell phones, etc. as represented by remote voters 25, 30. Alternatively, system 10 can be saved on a suitable storage medium such as a diskette, a CD, a hard drive, or like devices.

Local voter 35 may communicate with the media center 20 directly through devices available at the media center. The remote voters 25, 30 may communicate with the media center 20 through various paths: the Internet 40; wireless communication as represented by voice transmission 45, 50 through antenna 55, PBX 60, and gateway 65; or data transmission 70, 75 through antenna 80 and the Internet 40 or Ethernet 85. The remote voters 25, 30 can also communicate via satellites such as satellite 90. The remote voters 25, 30 may also communicate with system 10 at media center 15 without a corresponding system 10 installed on the device used by remote voters 25, 30.

The media center 20 transmits audio or visual media for viewing or listening, for example, to a screen in a movie theater or to televisions. The visual or audio media comprises many different logical branches and many different possible scenes. Some scenes may be parallel branches; these scenes branch into multiple paths but rejoin the storyline at the end of the scene. Parallel branches provide variety in the media but do not change the overall storyline or outcome.

Other scenes may be non-parallel branches. Following a non-parallel branch creates an alternate development in the media and creates an entirely different storyline and outcome. Logically, non-parallel branches follow paths that appear like the branches on a tree. Non-parallel and parallel branches can be combined with parallel branches for a hybrid branching approach to media presentation.

For further details regarding storyline branching, reference is made, for example to the following publications: U.S. Pat. Nos. 4,591,248; 5,465,384; 5,841,741; 6,360,055; 5,676,551; 6,245,402; and 6,108,001; U.S. Patent Application Nos. 2003/0068161; 2002/0053089; and 2001/0014209; and Japanese patent references Nos. JP 08-147939A; JP 07-037118A; and JP 62-175983A.

Local voters 35 and remote voters 25, 30 influence the storyline branches in the media presented by media center 20. System 10 accumulates the votes from local voters 35 and remote voters 25, 30 and follows branch preferences as indicated by the voting patterns of local voters 35 and remote voters 25, 30.

Alternatively, the media center 20 may present media following specific branches in the storyline to meet rating or content specifications for specific audiences or other criteria such as, for example, promotional or advertising events. Storyline branches may be selected to feature product placement of a particular product as a promotional event. After the promotional event is over, scenes with that particular product may not be presented by the media center 20.

Figure 2:
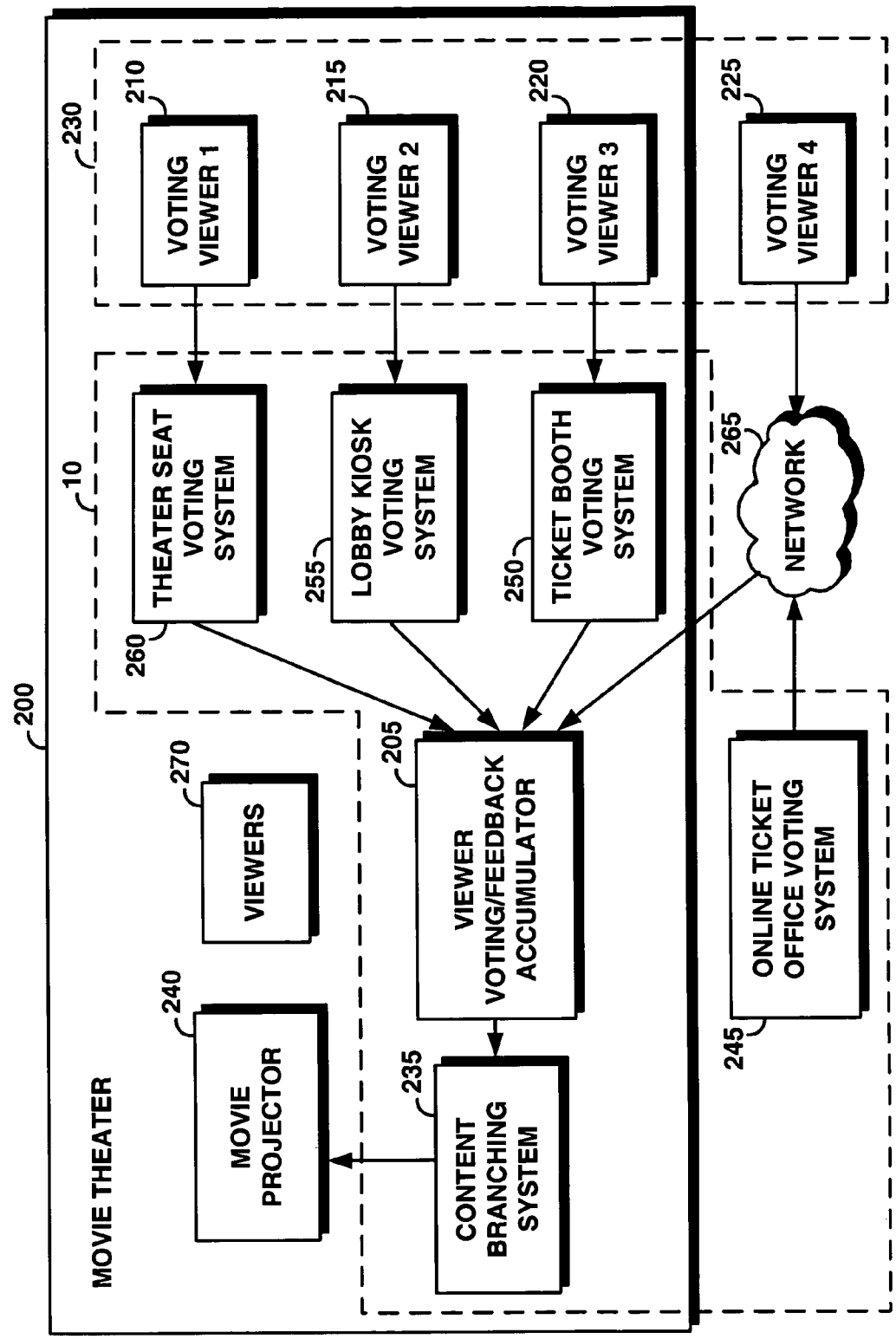
FIG. 2 is a block diagram of a high-level architecture of the content selection system of FIG. 1, as utilized in a movie theater.

FIG. 2 illustrates an exemplary use of system 10 in a movie theater 200 in which viewers vote to select branches in the storyline of a movie. System 10 comprises a viewer voting/feedback accumulator 205 that accumulates votes from a plurality of voters (or viewers), such as voting viewer 1, 210, voting viewer 2, 215, voting viewer 3, 220, and voting viewer 4, 225 (cumulatively referenced as voting viewers 230).

Viewer voting/feedback accumulator 205 counts the votes from the voting viewers 230, to determine which storyline branch may be presented to the audience. In one embodiment, votes from some of the voting viewers 230 may be weighted more than votes from other voting viewers 230, as determined by some criteria, such as purchase of a premium ticket, promotional event, etc.

Results from accumulating votes by the viewer voting/feedback accumulator 205 are transmitted to a content branching system 235. The content branching system 235 then follows the selected storyline or content branch determined by the viewer voting/feedback accumulator 205.

A movie projector 240 projects the selected storyline or content branch on the screen of movie theater 200. Voting may occur prior to showing the movie and during the movie presentation. The viewer voting/feedback accumulator 205 counts votes from both sources to determine the appropriate storyline branch.

System 10 comprises various methods for viewer voting interfaces such as, for example, an online ticket-office voting system 245, a ticket booth voting system 250, a lobby kiosk voting system 255, and a theater seat voting system 260. Voting viewer 4, 225, may select preferences for viewing when purchasing tickets through the Internet at the online ticket-office voting system 245. Voting viewer 4, 225, accesses the online ticket-office voting system 245 through a network 265. The online ticket-office voting system 245 transmits votes from voting viewer 4, 225 to the viewer voting/feedback accumulator 205 through network 265.

Voting viewer 3, 220, selects preferences for storyline variations when purchasing a movie ticket at the ticket booth of the movie theater 200. The preferences of voting viewer 3, 220, are entered in the ticket booth voting system 250 either directly by the voting viewer 3, 220, or by the employee selling the ticket. Voting viewer 2, 215, selects preferences for storyline variations at a voting kiosk in the lobby of the movie theater 200. The preferences of voting viewer 2, 215 are entered in the lobby kiosk voting system 255.

In one embodiment, voting viewer 4, 225, voting viewer 3, 220, and voting viewer 2, 220, obtain the right to vote for storyline variations in a movie by purchasing a ticket for the movie. In another embodiment, possible storyline variations for which the voting viewer 4, 225, voting viewer 3, 220, and voting viewer 2, 220, may vote are general in terms of plot, genre, etc.

In an alternative embodiment, voting viewer 4, 225, voting viewer 3, 220, and voting viewer 2, 220, select a specific version of the movie recommended by a movie critic or a friend by entering a series of numbers, or movie matrix, that reference specific logical branches in the storyline.

The audience in movie theater 200 may comprise voting viewers such as voting viewer 1, 210 and non-voting viewers such as viewers 270. The privilege of voting for storyline branches may be obtained by purchasing a premium movie ticket, purchasing a number of votes in addition to a movie ticket, or any other criteria selected by the movie theater or movie producer. For example, a promotional event may provide a voting ticket to those viewers that purchase a specific product either at the movie theater or before attending the movie. In addition, promotional coupons may be provided to movie viewers that enable them to vote for storyline branches.

Voting viewer 1, 210, selects storyline preferences at a theater seat through the theater seat voting system 260. Prior to the start of the movie, the preferences may be general, as those selected by voting viewer 4, 225, voting viewer 3, 220, and voting viewer 2, 220. During the movie presentation, the voting viewer 1, 210, may vote on specific branches in the storyline as they are presented on the movie.

Voting viewer 2, 210, may vote using a variety of devices associated with the theater seat. Voting may be accomplished using a touch screen, for example, either in the arm of the theater seat or the back of the seat in front of voting viewer 2, 210. Alternatively, a simple keypad may be used. Further, a wireless device may be used. Voting viewer 2, 210, may also use a wireless device to vote for storyline branches.

In one embodiment, appropriate intervals during the movie in which voting may take place may be signaled, for example, by a flashing light on the theater seat voting system 260, a vibration, or a message on the movie screen. The movie theater 200 may optionally select to allow only a few voting viewers 1, 210, to vote at any one time to minimize distractions during the movie, for example. In this case, the voting indication may only be activated for a few voting viewers 1, 210. Other viewing voters 1, 210, are not alerted that a voting opportunity was available.

Within a group of voting viewers 1, 210, votes may be weighted differently. In an embodiment, a move ticket may be priced to reflect a spectrum of voting privileges. For example, a basic movie price allows a viewer such as viewer 270 to attend the movie with no voting privileges. The voting viewer 1, 210, may purchase a higher priced ticket that allows a certain number of votes during the movie. The voting viewer 1, 210, may also purchase a premium ticket that provides, for example, an unlimited number of votes or votes that are weighted more than a standard vote. Additional tiers representing numbers and weights of votes may be provided by the movie theater 200. A voting right ticket system could allow the individual rights to vote in pre-assigned slots or optionally give the user with limited votes to use them at any branch he/she chooses.

The voting viewer 1, 210, may be viewing a movie they have previously seen. The voting viewer 1, 210, may not place as much value on some branches in the movie but be very interested in other branches in the movie. Consequently, the voting viewer 1, 210, may choose to place votes only at the branches that are of most interest. For example, the voting viewer 1, 210, particularly remembers three branches out of a total of thirty branches after viewing a movie. The voting viewer 1, 210, wishes to view the "other" version of the movie at those three branches. The voting viewer 1, 210, may purchase a movie ticket with three votes and place those votes specifically at those three branches.

Alternatively, the voting viewer 1, 210, may purchase a ticket that allows the voting viewer 1, 210, to place a weighted vote at each of those three branches such that the voting viewer 1, 210, has a greater chance of influencing the selected path at those three branches. For example, the voting viewer 1, 210, may purchase a triple-weighted ticket, weighting each vote by a factor of three. However, if the branches of interest to the voting viewer 1, 210, are non-parallel, a selection of the first branch of interest may prevent the second and third branches from appearing. Each non-parallel branch in the movie may take the storyline in diverging directions.

The voting viewer 1, 210, may establish a voting account with, for example, a credit or debit card. As voting viewer 1, 210, places votes, a voting fee is added to the voting account that is later billed to the credit card of the voting viewer 1, 210, or automatically debited from the debit card. The voting viewer 1, 210, may also purchase a voting card with a certain number of votes that can be placed in any movie presented by the movie theater 200. Votes are deducted from the voting card when the voting viewer 1, 210, votes for specific storyline branches.

Movie theater 200 may provide an "instant upgrade" option allowing voting viewers 230 the opportunity to upgrade a ticket. A voting viewer 230 may have purchased a limited voting ticket. During the movie, the voting viewer 230 may prefer to vote more often or have their vote weighted more heavily. Using an "instant upgrade" option, the voting viewer 230 may, for example, use a credit card, cash, or a debit card issued by movie theater 200 to purchase an upgrade to the theater ticket.

Viewers 270 may decide, after a movie has begun, that they wish to vote on the storyline of the movie. Movie theater 200 may provide a method at the theater seat that allows viewers to purchase votes as the movie progresses. For example, viewers 270 may purchase a block of votes or just a few votes. Viewers 270 may purchase the votes by credit card, debit card, cash, etc.

Movie theater 200 may encourage return visits by offering discounts on tickets or votes for frequent patronage of the theater. This "frequent voter program" may be based, for example, on number of votes purchased, number of movie tickets purchased, total value of purchases to date, etc. The "frequent voter program" may be offered in conjunction with promotional programs, targeted toward attendance of a specific movie, a specific movie theater 200, or chain of theaters 200, etc.

The specific storyline of a movie presentation in movie theater 200 may be represented by a movie matrix, or series of numbers, indicating the storyline branches taken during the presentation of the movie. In an embodiment, viewers 65 and viewers 230 may receive a printed matrix representing the version of the movie that was presented as a result of audience voting. The movie theater 200 may also provide the matrix for a specific movie screening on a website; viewers 65 and viewers 230 may access the website to download the matrix for a movie seen by themselves, a friend, etc. Viewers 65 or viewers 230 may later request the same version by presenting the matrix for that movie. A movie critic can also specify the movie matrix in a movie review.

Movie theater 200 can present various versions of the same movie on several screens. Using system 10 and storyline branching, each movie is a different viewing experience. One screen may present the movie as reviewed by a noted movie critic. Other screens may present the movie as the "director's version", the version preferred by the movie director, a version preferred by one or more actors in the movie, a version preferred by the movie studio, etc. A third screen may present a version suitable for children, while a fourth screen may present a version suitable for adults. Additional screens may present versions in which voting viewers 230 may influence the direction of the storyline of the movie. A movie screening may be presented as a promotional version featuring product placements from various advertisers.

Given the ability to specify a movie version with a matrix, groups of like-minded individuals may form "communities" of movie voting viewers 230. These communities may form in a geographical area or a virtual area on the Internet. Members of these communities may view and then critique a movie version for others in the community; rankings for specific versions of the movie (specified by the movie matrix) may be posted for others in the community. A community may, as a group, request a specific version of a movie for screening at movie theater 200.

In an embodiment, movie theater 200 can "guarantee" a unique viewing experience for some presentations of a movie. For example, movie theater 200 may compare the current presentation of a movie to past presentations in movie theater 200 and ensure that duplicate runs are not allowed. Movie theater 200 may advertise that the viewer is guaranteed a new movie presentation each time the viewer attends that movie. In a further embodiment, movie theater 200 may specify a degree or percentage at which the movie presentation is unique or different from previous presentations of that movie. In yet another embodiment, viewers may present matrices for versions of the movie they have previously seen. Movie theater 200 may guarantee to some degree that the movie presentation does not repeat entirely any of those matrices.

In one embodiment, movie releases may be tailored to specific geographic regions to reflect the values of those regions. For example, language, nudity, sexual content, etc. that is acceptable to viewers on the west coast may not be acceptable to viewers in the Midwest.

In a further embodiment, system 10 may be used on DVDs viewed at home. Users may specify the movie version using a movie matrix or select general preferences in plot, language, nudity, sexual content, violence, etc. Users may also specify logical branches in the storyline as the movie progresses for a viewer experience similar to that in the movie theater 200.

In yet another embodiment, system 10 may be used for broadcast media including cable, satellite, or pay-per-view events. A community of viewers in a geographic region may vote for general preferences, ratings preferences, or a specific movie matrix. In an embodiment, system 10 may be applied to television shows, movies, special events, or other broadcast media. In a further embodiment, individuals may vote for general preferences, ratings preferences, or a specific movie matrix. Parents may specify criteria to which the programming watched by their children must adhere. The privilege of specifying content, ratings, storyline branches, etc. on broadcast media may or may not require a viewer surcharge. Broadcast media may use system 10, for example, as method to increase viewing during the months that advertising rates are set, as a service to a community, or to increase revenue.

Figure 3:
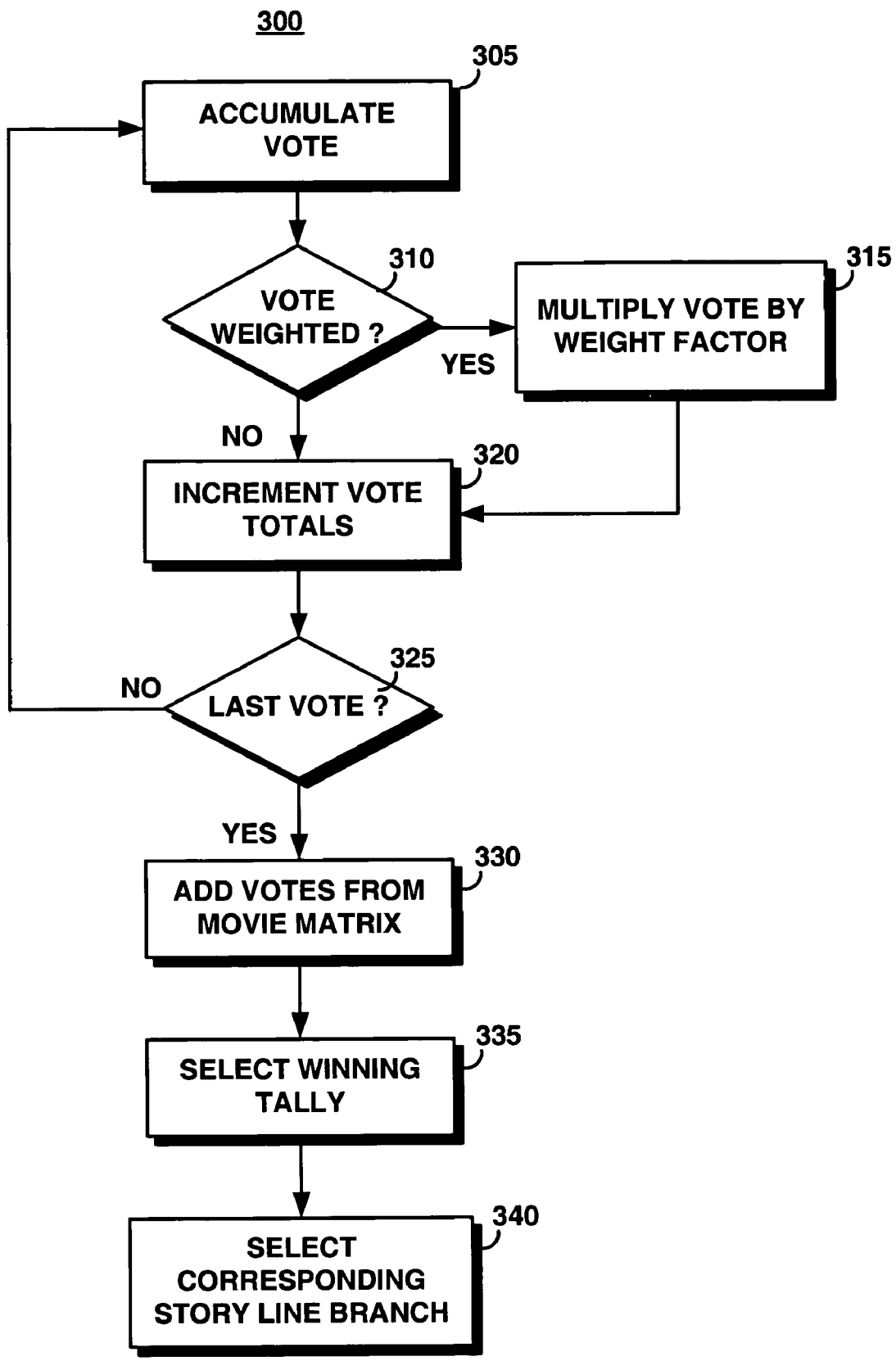
FIG. 3 is a process flow chart illustrating a method of use of the content selection system of FIGS. 1 and 2.

A method 300 for accumulating votes in determining storyline branching is illustrated by the process flow chart of FIG. 3. The viewer voting/feedback accumulator 205 accumulates votes at step 305. If the votes are weighted at decision step 310, the viewer voting/feedback accumulator 205 multiplies the votes by the appropriate weight factor at step 325.

Vote totals are incremented at step 330. If additional votes remain to be accumulated at decision step 325, process 300 returns to step 305 and steps 305 through 325 are repeated until all votes have been incremented for a specific storyline branch.

System 10 may not accept any additional votes for a specific storyline branch within a certain time before the specific storyline branch occurs to allow adequate processing of votes. At step 330, the viewer voting/feedback accumulator 205 adds votes from requested movie matrixes submitted by viewers prior to the movie screening.

A winning tally is selected at step 335 based on all the accumulated votes. The viewer voting/feedback accumulator 205 then transfers the winning storyline branch to the content branching system 235 at step 340 and the appropriate storyline branch is displayed on the movie screen.

It is to be understood that the specific embodiments of the invention that have been described are merely illustrative of certain applications of the principle of the present invention. Numerous modifications may be made to the system, method, and service for showing and selecting diverging storylines using branching techniques described herein without departing from the spirit and scope of the present invention.

What is claimed is:

1. A method for selecting a logical branch in a storyline among a plurality of available storyline branches on a computing device, based on voters' votes, comprising:

obtaining and accumulating, the votes from the voters on a computing device for at least one of the plurality of available storyline branches, during the presentation of the storyline;

selectively excluding votes, using the computing device, based on voter characteristics from the accumulated votes for a specific storyline branch;

multiplying, using the computing device, at least one received vote by a weight factor based on voter characteristics, the weighting factor being based on at least ticket pricing;

calculating, using the computing device, a total for the accumulated and weighted votes; and determining, using the computing device, a winning tally that corresponds to one of the plurality of available storyline branches;

selecting and presenting, using the computing device, at least one of the available storyline branches with the winning tally as a future storyline branch during the presentation of the storyline, and generating, using the computing device, a media version matrix specifying a selected storyline having a particular set of logical branches selected by the voting for later use and retrieval, by recording each selected corresponding storyline branch of the plurality of available storyline branches on the computing device.

2. The method of claim 1, further comprising transferring the future storyline branch to a content branching system.

3. The method of claim 2, further comprising displaying the transferred future storyline branch.

4. The method of claim 1, further comprising selectively excluding votes for a specific storyline branch.

5. The method of claim 4, wherein selectively excluding votes for a specific storyline branch comprises excluding the votes within a predetermined period of time before the specific storyline branch occurs.

6. The method of claim 1, further comprising determining if the votes are weighted.

7. The method of claim 6, wherein if the votes are weighted, selectively multiplying the votes by respective weight factors.

8. The method of claim 1, further comprising determining if additional votes remain to be accumulated; and wherein if additional votes remain to be accumulated, repeating an accumulation of the votes until all the votes have been incremented.

9. The method of claim 1, further comprising saving a record of the selected storyline branch for later replay.

10. The method of claim 6, wherein the votes are weighted based on a graduated ticket pricing.

11. A computer executable program product comprising computer executable instructions tangibly embodied on a computer readable medium wherein the computer executable instructions perform the method steps of:

presenting a storyline having a plurality of possible future storyline branches to a plurality of voters;

obtaining and accumulating votes from said voters for at least one of the plurality of possible continuing future storyline branches during the presentation of said storyline;

selectively excluding votes based on voter characteristics from the accumulated votes for a specific storyline branch;

multiplying at least one received vote by a weight factor based on voter characteristics, the weighting factor being based on at least ticket pricing;

calculating a total for the accumulated and weighted votes; and determining a winning tally that corresponds to a specific storyline branch; and selecting and presenting, at least one of the available storyline branches with the winning tally as a future storyline branch during the presentation of said storyline based on the accumulated votes; generating a media version matrix specifying a selected storyline having a particular set of logical branches selected by the voting for later use and retrieval, by recording each selected corresponding storyline branch of the plurality of available storyline branches on a computing device.

12. The computer program product of claim 11, further comprising the method step of transferring the selected storyline branch to a content branching system.

13. The computer program product of claim 12, further comprising the step of displaying the transferred storyline branch.

14. The computer program product of claim 11, further comprising selectively excluding votes for a specific storyline branch.

15. The computer program product of claim 14, further comprising the step of excluding votes cast within a predetermined period of time before the specific storyline branch occurs.

16. The computer program product of claim 11, further comprising the method step of determining if the votes are weighted.

17. The computer program product of claim 16, further comprising the method step of selectively multiplying the votes by respective weight factors.

18. The computer program product of claim 11, further comprising determining if additional votes remain to be accumulated; and if additional votes remain to be accumulated, repeating the accumulation of the votes until all the votes have been incremented.

19. The computer program product of claim 11, further comprising saving a record of the selected storyline branch for later replay.

20. The computer program product of claim 16, further comprising the method step of weighing the votes based on ticket pricing.

21. A system for the dynamic selection of a logical branch from a plurality of available branches in a storyline recorded on an electronic medium comprising:

a media center that presents to a voter recorded media having a plurality of available logical branches;

at least one computer coupled to said media center, said computer also being coupled to said at least one voter through a voter interface;

said at least one computer having programming code to obtain, accumulate and process votes from said at least one voter;

wherein during the presentation of said recorded media having a plurality of available logical branches said computer receives at least one vote for at least one of the plurality of available storyline branches from said at least one voter through said voter interface means, accumulates said at least one vote for at least one of the plurality of available storyline branches, multiplies at least one received vote by a weight factor based on voter characteristics, the weighting factor being based on at least ticket pricing, selectively excludes votes based on voter characteristics from the accumulated votes for a specific storyline branch, determines a winning tally that corresponds to a specific storyline branch and selects at least one logical branch, associated with the accumulated votes, from the plurality of available branches as a future storyline branch creating an interactive storyline in real time, and generates a media version matrix specifying a storyline having a particular set of logical branches for later use and retrieval.

22. The system of claim 21, further comprising a media version matrix generated by recording the at least one logical branch selected by the voting during the presentation of said recorded media having a plurality of available logical branches.

23. The system of claim 22, wherein said at least one computer specifies a particular previously selected storyline from said plurality of possible storylines to be presented to a voter through said media center by recalling said version matrix associated with said recorded logical branch.

24. The system of claim 21, wherein said at least one computer coupled to said media center includes at least one portable device.

25. The system of claim 24, wherein said voter interface is said at least one portable device.

26. The system of claim 21, wherein said voter interface is a device directly coupled to said media center.

27. The system of claim 25, wherein said voter interface is indirectly coupled to said media center via an over the air interface.

* * * * *